May 9, 1950 L. H. D. FRASER Re. 23,228

HEAT INSULATING MATERIALS AND METHOD OF MAKING

Original Filed April 24, 1945

Inventor
Lewis H. D. Fraser
by Roberts, Cushman & Grover
Att'ys.

Reissued May 9, 1950

Re. 23,228

UNITED STATES PATENT OFFICE 23,228

HEAT INSULATING MATERIALS AND METHOD OF MAKING

Lewis H. D. Fraser, Chicago, Ill., assignor to Owens-Illinois Glass Company, a corporation of Ohio Original No. 2,469,379, dated May 10, 1949, Serial No. 589,971, April 24, 1945. Application for reissue January 30, 1950, Serial No. 141,320

13 Claims. (Cl. 106—86)

Figures 1, 2:
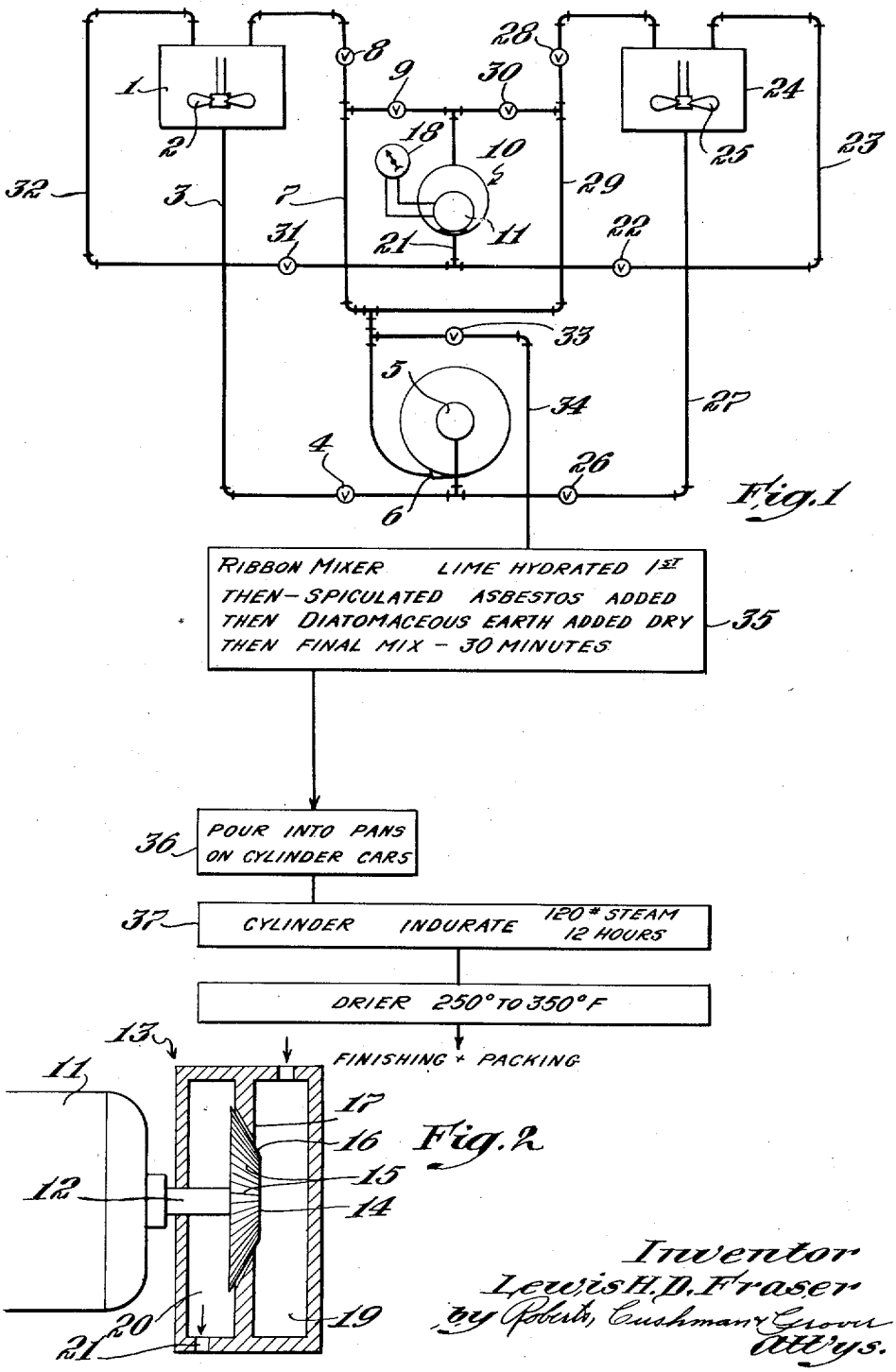

Matter enclosed in heavy brackets [ ] appears in the original patent but forms no part of this reissue specification; matter printed in italics indicates the additions made by reissue

This invention relates to a new type of heat insulating materials and to improved compositions and methods for their preparation.

In the art of making and using insulating materials, and especially in heat insulation for the conservation of high temperatures, it is necessary to provide a "high temperature" material for those areas where high temperatures prevail, i. e., above 600° F. But such "high temperature" insulating materials have other characteristics. Thus, they are generally of high density and accordingly heavy. Moreover, they are usually not form-retaining or their heat conductivity is higher than would be desirable. The cost is also comparatively high.

A sufficient thickness of such "high temperature" insulation material could be employed, so as to insulate high temperature surfaces. But this is not done. It is generally conceded that it would entail too great a weight of insulation, too thick a covering (with too large an exterior surface for radiation and loss of heat) and too great an expense. Hence, it would constitute a generally unsatisfactory installation.

It has for these reasons become standard practice in the insulating of high temperature surfaces to apply a high temperature insulation material which will withstand the heat, and of a sufficient thickness so that the temperature gradient from its high temperature side to its low temperature side will assure a temperature of 600° F. or somewhat less on the low temperature side. This temperature is established as a criterion by the upper safe limit of temperature for the "low" or "lower temperature" insulation materials which are available, such as molded (85°) magnesia. Insulating materials of the "lower temperature" type have the advantage of lower apparent density, and lower heat conductivity. Consequently, they afford a much greater heat insulating efficiency for the outer or lower temperature areas or zones of such insulating constructions. But these materials are of low form-retaining value or low tensile strength and characteristically fail to withstand high temperatures. Thus, 75° magnesia tends to calcine and weaken or disintegrate at temperatures above 600° F.

Moreover, both the "high temperature" and "low temperature" types of heat insulating materials (but especially the low temperature types) are weak and also subject to further weakening or to softening and disintegration by moisture, such as the bilge water in vessels or the condensate water, water vapor, etc., in enclosed buildings or towers. Hence, while they are used in such places, special provisions and constant care are necessary to avoid or prevent their disruption and failure.

It is, therefore, an object of the present invention to provide an improved type of insulating materials which may be applied to high temperature surfaces, which shall be form-retaining, and which shall also be of low heat conductivity and low apparent density, and of which the entire insulation may be composed. It is also an object to provide an insulating material which shall be strong when dry and also resistant to moisture, with minimum loss or reduction of its other desirable properties. Other objects will appear from the following disclosure.

It has been an underlying concept of the heat insulation art that, quite apart from the intrinsic heat conductivity of a material, it could be rendered of low effective conductivity if it contained numerous voids or air spaces, especially if the voids were individually small so that convection currents of air set up in them could be neglected, as in finely divided powders. Such powders have been bonded together, so as to retain them in shaped forms and dimensions. Numerous heat insulating materials have also been made of porous materials, either natural or synthetic, having a sponge-like structure. Such a structure is effective to promote resistance to the free conductivity of heat therethrough. But, in general, the volume of such bonded powders and porous wall structures, compared to the voids or air spaces enclosed by them, is relatively large. Hence, such insulating materials have a relatively high apparent density. Evidence of this is afforded by the present standards in which "medium weight" heat insulating materials have an apparent density of about 20 lbs. per cubic foot, while even "light weight" heat insulating materials have an apparent density of 14 to 16 lbs. per cubic foot. Though the latter have sometimes been made as low as 12 lbs. per cubic foot, it has been only at the sacrifice of some of the standard requirements, even for low temperature insulation. Hence, such products are applicable for special purposes only.

It has been proposed to use as heat insulating materials various kinds of fibers, in which voids or air spaces are partially enclosed (rather than completely occluded) by the intertwined masses of fibers. In employing this type of heat insulating construction, the result obtained is limited inherently by the types of fibers (such as natural or artificial, etc.), and by the steps or procedure necessary to convert them to the consistency and forms desired. Bonding materials have been required in order to impart shape to the mass, and retain the shape and/or volume of the shaped mass. These have heretofore usually been in a liquid state and consequently, to a large extent, defeat the advantages of the fibrous structure. The liquid bond tends to fill the voids and spaces between the fibers and to change the character of the solids and voids from that of a mass of loose fibers and narrow capillary air spaces between them to that of round air spaces occluded by solid separating walls of fiber and binder. They are, therefore, structurally similar to the bonded powders and porous wall structures above described, thus adding both weight and increased heat conductivity to the resulting product.

In general, therefore, it may be said that the insulating materials of the prior art fall into several categories based upon their compositions and physical structure, as follows:

I. There are those which are composed of finely divided separate particles which tend to pack loosely and occlude large proportions of air, distributed between them in the form of numerous and more or less continuous thin films.

For example, in calories per square centimeter per second per centimeter of thickness, lamp black (C=.00007), lime (.00029), magnesia (.00016–.00045), magnesium carbonate (.00023–.00025), dry sand (.00093), sawdust (.00012), charcoal (.00012), carborundum (.0005), sil-o-cel (.00011).

But since these are loose powders they consequently have no form-retaining value, and, hence, no compressive or tensile strength whatsoever.

II. There are those which are composed of small solid particles, in loosely or closely packed arrangement, and bonded together in this relationship by various means, leaving some of the air spaces open. These air spaces serve to impart a lower conductivity of heat with reference to the mass as a whole, compared to the heat conductivities of the solid particles or of the bonding material per se. But the volumes of the air spaces between the loose particles and their individual sizes and shapes are considerably modified by the bonding material used, as above pointed out. Insulating materials of this type, therefore, have a considerably higher conductivity of heat than the loose, unbonded powders.

Such insulating materials are as follows:

| | |
|---|---|
| Magnesia brick | .0027–.0072 |
| Carborundum brick | .032–.027 |
| Concrete stone | .0022 |

It will be observed that in bonding the particles together, the product is made susceptible of molding, and upon setting of the bond it is often possessed of high tensile and compressive strength in the mass and, therefore, form-retaining. However, the increase in apparent density and in heat conductivity is so many times greater than that of the loose particles, in their unbonded, independent spaced relationship, that their utility, as insulation materials, falls into an entirely different order of effectiveness.

III. The third type of insulating materials is that which presents the cellular or vesicular characteristic of structure. Instead of consisting of solid particles, spaced apart by loose packing, or particles more or less bonded in this loose arrangement, they consist of a continuous solid wall or body material in which air is dispersed in the form of bubbles. These bubbles of air are consequently more or less, or completely surrounded or occluded by the solid material.

Such insulating materials are: diatomaceous earth (.00013), plaster of Paris (.0007), firebrick (.00028–.0011), infusorial earth pressed bricks (.0003), and chalk (.002).

This type of insulation is characterized by relatively low heat conductivity or high strength, but not both together. Moreover, these materials are either naturally formed products which would require special shaping or are of relatively high apparent density.

In these several types of insulating materials, in which the structure is that (I) of loosely packed, finely divided particles, or (II) of such particles bonded together to form an integrated mass, or (III) of a continuous solid, occluding dispersed voids or bubble-shaped spaces filled with gases; the conductivity of the mass as a whole is predominantly the conductivity of the solid and, hence, relatively high. Though the air spaces are small, they are nonetheless occluded or surrounded by solids and, hence, conducive to transmission of heat by convection of the gases within them, radiation across them, and conductivity around and through their marginal surfaces. Moreover, the free surfaces of the material, in such form-retaining structures, whether internally or externally spherical, and, hence, generally concave or convex in character, will tend to be of dense formation, as an inherent result of the conditions under which they were assembled and integrated. Their unions in many cases will be generically those which are typical of formation by the capillary wetting of solids and liquids.

Hence, insulating materials of these types, in acquiring their molding and form-retaining properties, and increased tensile and compressive strengths, have, at the same time, increased greatly in their heat conductivity and, consequently, lost greatly in respect of their heat insulating qualifications. They are also of relatively high apparent densities, and constructions made of them are correspondingly heavy.

IV. There is also a group of insulating materials which are characteristically composed of loose, fine fibers and which possess a very low heat conductivity, and, therefore, of high insulating value, for example:

Asbestos fiber (.00019), cork (.00072–.00013)
Cotton wool (.000043), felted (.000033)
Eiderdown (.000046), felt (.000087)
Balsam wool (.000093), hair insulation composed of 75% hair and 25% jute (.000093), 50% hair-50% jute (.000089)

It is to be observed that these loose fibrous masses are typically of very low heat conductivity. This is attributable to the dispersed, random relationship of the fibers and to the minute, complex, but continuous system of open spaces between the fibers which are filled with air.

Air has a very low conductivity of heat, especially when in small volumes which cannot effectively circulate to transfer it by convection, namely, .000058 calorie per square centimeter per second per centimeter of thickness. But masses of loose fibers have no form-retaining capacity and present no tensile or compressive strength. On the contrary, they may tend to mat down, even under their own weight, become more dense and more highly conductive of heat and less effective for insulation and leaving an uninsulated air space above them.

V. The loose fibrous insulating materials have been made into sheets possessing some tensile strength, but such sheets are still lacking in compressive strength and form-retention. It may be observed that such fibrous sheet materials present relatively low heat conductivities and, hence, high insulating values, though, in general, these properties are somewhat reduced from those of the loose fibers, and the satisfactory application of them in actual practice is limited. For example:

Asbestos paper (.0004–.0006)
Blotting paper (.00015), felt (.000087), flannel (.00023)
Hair cloth felt (.000042), leather cowhide (.00042)
Chamois (.00015), kapok between burlap or paper (.000083)
Eelgrass between kraft paper (.000086), felted cattles' hair (.0000895)
Flax fibers between paper (.000096)
Jute and asbestos fibers felted (.000127), hair and asbestos fibers felted (.000096), flax fiber (.000096)
Flax fiber (.00011), flax and rye fiber (.00011)
Rock wool or glass wool (.00009)

These sheeted fibrous materials are also lacking in form-retention and in tensile and compressive strength. Moreover, with the exception of asbestos, rock wool, mineral wool and glass wool, they are of organic origin and, hence, disintegrate or are inflammable at high temperatures. Consequently, they cannot be used where shaped insulation is required, nor at high temperatures. Furthermore, they are compacted readily by pressure, or by their own weight, in the course of time, whereupon their effective heat conductivity rises, and their apparent density also increases, which is undesirable.

VI. Attempts have been made to bond these fibrous materials analogous to the bonding of granular insulating materials or powders in groups II and III described above. But the same results and consequences accrue, namely, a more solid structure, resulting in a greatly increased apparent density of the mass and a higher effective conductivity of heat. These changes are attributable to a compacting of the fibrous mass in the bonding operations, the introduction of filling materials between the otherwise loosely spaced fibers, and the formation of a wetting meniscus of the bonding material upon and between the adjacent fibers, constituting an occluding wall or membrane in the finished product, which is of a continuous character throughout the volume of the mass and which adds both to the weight and to the heat conductivity of the whole.

In accordance with the present invention, a new type of insulating material is provided which is primarily of inorganic composition and resistant to high temperatures and characterized by a loose, open, fibrous structure, in which the fibers are randomly arranged and separated or spaced apart by a system of fine, continuous, capillary air spaces. This insulating material is form-retaining, and at an apparent density of 12 lbs. per cubic foot the thermal conductivity "C" of this new product approximates 0.0002. The fibers are joined together at their interstices or contacts but not by occluding liquid binders or binders which have solidified from a liquid to a solid state and, hence, tend to draw the fibers together and form rounded, occluding boundaries to the air spaces. The synthetically formed and crystallized fibers are joined by direct inherent intergrowth of the fibers with themselves, and by union with other preformed organic fibers, or inorganic fibrous crystals such as asbestos, which are of a similar character and habit.

In the fundamental aspects of this invention it is found that reagent materials, and, more particularly, inorganic reagent materials, which are capable of reacting to form crystal growths of a fibrous habit, may be induced or permitted to develop such fibrous forms predominantly, if not exclusively, and completely, by the provision of a condition of dispersion of the reagents, and by providing commensurately therewith a dispersion of preformed finely divided fibers or spicules (i. e., fibers which already possess and/or which develop before or during their preparation a characteristically, finely divided fibrous form as hereinafter more specifically defined), presenting an abundance of free, fine fibrous ends, which are active to serve as centers for the incipient commencement of crystallization of the fiber-forming reagent materials and to insure or promote the development of the latter into fine, discrete, fibrous, crystalline form.

The preformed activating fibers or spicules, thus serving as instigators of the incipient crystallization of reaction products (which are inherently capable of forming fibrous products) and directives of their development in crystalline form, may be organic or inorganic.

In the latter case, if suitably dispersed, the preformed fibers and the segregating crystals derived from the fiber-forming reagents may crystallize, inter se, and thus, inherently integrate to form a continuous, but filamentary, dispersed aggregation of spaced fibrous crystals.

In the present specification and claims, the expression "spiculation" refers to a treatment of naturally fibrous materials, such as asbestos, by which the bundles in which they are usually found are separated longitudinally to a sufficient degree, such that the individual fibrous filaments, resulting present cross-sectional dimensions of one-tenth to three microns, in either width or breadth, at their extremities or throughout their lengths. The degree and type to which it may be carried may be controlled, inter alia, by the fibrous material used, by the type of apparatus employed, by the viscosity of the medium in which the treatment is carried out, by the efficiency of operation attained.

The term "spicules", as used in this specification and in the claims, designates fibrous particles (as obtained by the "spiculation" treatment) which are characterized by cross-sectional dimensions at their extremities of one-tenth to three microns in either width or breadth and which in length may be of different orders. For example: (A) in the case of complete spiculation of asbestos, in a medium of low viscosity such as air or dilute aqueous suspension, spicules of from ten to one thousand microns in which the above-noted dimensions persist throughout their length; (B) in the case of partial spiculation of asbestos, as in the beating of the fiber in more concentrated aqueous suspensions (of 1% to 10% by weight) in which the spicules are typically from one hundred to two thousand microns long, usually associated with a small proportion of fibers of the order (A); and (C) in the case of spiculation by a high speed vortex action in a high concentration of asbestos in a liquid medium (e. g. 1% to 10% by weight, in water) as accomplished in the apparatus shown in Figure 2— spicules having a small proportion of fibers of lengths of the order (A) and a larger proportion of fibers of lengths greater than one thousand microns, and further characterized by frayed or "broomed" ends, presenting a plurality of discrete fibrous filaments having individual cross-sectional dimensions at their extremities, in either width or breadth, of from one-tenth to three microns.

The viscosity of the resulting aqueous suspensions, when compared at the same concentration of solids present, is a measure of the degree of spiculation effected.

As above-mentioned, the preformed finely divided spiculated fibers may be organic in character. In this case, while capable of serving the same physical purpose of inducing crystallization from their free ends and separate formation and growth into inorganic fibrous crystals, the organic fibers will nevertheless not, in such cases, cohesively integrate with them, in the sense of continuity of inherent physical structure, though they may present a certain degree of integration by virtue of physical adhesion therewith and especially at their free ends.

In either of these cases, however, with preformed inorganic or organic fibers, the crystals forming as a result of reaction of the reagents present may also freely grow together between themselves at their points of incipient contact and thus form an integral fibrous mass, throughout the entire volume of the dispersion in which they are contained. The strength of the resulting integrated filamentary system is the cumulative inherent tensile strength of the crystals themselves, and of the organic or inorganic fibers which served as nuclei in the fibrous crystalline formation.

In either case, the system is one of molecularly dissolved and/or colloidally dispersed reagents, capable of reacting to form inorganic crystals of characteristics fine needle-shape or fibrous properties and burr-like habit of growth (resembling thistledown clocks) which are induced selectively to undergo such reaction and to develop such habit of growth at numerous points (often in clusters of a circular radial crystal) dispersed separate from each other in three dimensions—from which points they are free and maintained free to extend in all directions through the dispersing liquid medium, throughout the period of their reaction. Such growth will preferably be impeded only by contact with similar crystals, forming under similar conditions of instigation and growth, whereupon they may grow together therewith at the point of mutual contact. They may also contact with the surfaces of the preformed fibers, with which they may grow together (adhesively) at such point or points of contact with them in solid, fibrous crystal formation. In either case of such contact growth the liquid phase, and consequent viscosities and meniscus formations which attend it, is not preserved by solidification but replaced by the separation of inherent crystalline growth of the fiber-forming reagents, and usually of a gel which subsequently occupies very much less volume.

The predominant feature of the reactive mass, therefore, is that the reagent materials are presented to so many and such definitely dispersed points (about which their incipient reaction and subsequent crystal formation may take place) by the dispersed ends of the spiculated fibers, that the crystallization and growth of each crystalline fiber is substantially uni-dimensional and, in cross section, of substantially colloidal dimensions only, both per se, and in its contacts and intergrowths with others.

By the present invention, therefore, it is found that if reagent materials having an inherent characteristic of forming products of fibrous crystal growth are subjected to conditions under which such products shall form and such fibrous crystals can grow freely from widely spaced and dispersed points of instigation or origin, and kept dispersed during at least a substantial period of such growth, they will tend to form a finely fibrous mass of crystals. These crystals will include a large proportion of spaces or voids, will unite directly with such points of origin and bond with other fibrous materials (without inclusions or occulsions of other and different bonding materials, such as adhesive binders, cohesive fusions, etc.) and develop their individually marked characteristics of high tensile and compressive strengths (due to their high ratio of surface to volume and "skin effect" characteristics), and remain spaced apart by fine, elongate, continuous, capillary spaces, rather than occluded spherical air spaces with solid, opposed, surfaces, and, hence, manifest a low apparent density, relatively high compressive and tensile strengths, a low conductivity to heat, and, conversely, high heat insulating properties.

To this end, it is found that, for example, lime and silica, if in finely divided and mutually reactive condition such as an aqueous solution or colloidal suspension, of active or hydrated lime and active or hydrated silica, tend to react, as by the direct application of heat and pressure, to form hydrated calcium silicate, which is capable of an appropriate needle-like or fibrous crystal formation.

In ordinary mixtures of lime and silica (such as for sand-lime bricks), the resulting product will be high apparent density (e. g., 120 lbs. per cubic foot). The reaction will also be more or less incomplete under the conditions because much of the silica is not available for reaction with the lime.

But if lime is employed in the form of quicklime, hydrated lime, or milk of lime, and preferably containing a high proportion of active (e. g., sugar soluble) lime the reaction is increasingly promoted in activity and completeness. If the silica is finely divided, it is more reactive, but its chemical condition is also important. It is preferably used in the form of "active" silica, such as diatomaceous earth or hydrated silica. The reaction is initiated and promoted by water, steam, increased pressure, etc., and also by the condition of the lime, as in the controlled hydration of the lime to produce milk of lime of maximum activity. The reaction of lime and silica can be promoted, in accordance with the present invention, so as to result in substantially complete transformation of both into a mass of calcium silicate a considerable proportion of which is in the form of discrete, needle-like crystals and of a new molecular form of hydrated calcium silicate. It is now found that the distribution of the needle-shape or fibrous form of these crystals can be promoted and controlled by the presence of suitably preformed, dispersed spiculated fibrous particles, or spicules, as above-defined, such as asbestos, paper fibers, and the like. Moreover, the crystallization will tend to grow outwardly from such spaced points of inception which are presented by the free, and preferably freshly fractured ends of the preformed fibers. Thereby the fibrous crystals formed are dispersed and kept dispersed by their own growth, and by the spiculated characteristics of the preformed fibers, as well as by the water (and steam) in and from which they are formed. Upon evaporation of the residual steam and water from between the mass of formed and full crystallized, fine needles, the voids are occupied by air. (There is also an enormous shrinkage in the gel which is usually formed in the reaction.) As a result the mass as a whole will thus contain a considerable volume of air, so that the apparent density may be correspondingly low and considerably less than that of "heavy," "medium," or "light" weight insulating materials heretofore known to the art.

The preformed fibrous or "spiculated" component which is suitable for thus effecting the present invention may, as already stated, be of organic or inorganic origin or composition, and will have corresponding properties and utilities accordingly. It is characteristically of a colloidal order of dimensions, in its cross-sectional dimensions, namely, from less than one to three microns, and of dimensions in length which considerably dominate the cross-sectional dimensions, but which are still of small dimensional order, relative to untreated fibers, for example, ten to one thousand microns, one hundred to two thousand microns, or over one thousand microns. Such fibers, therefore, are susceptible of dispersion in a liquid medium such as water and of maintaining such dispersion for a considerable period of time, without appreciable loss of uniformity or spontaneous dewatering or segregation of the liquid therefrom by gravity, on standing.

Such spiculation of asbestos or other fibers to a cross section of less than three microns, and lengths of at least three times their diameters, has a certain distribution significance. That is:

Suppose each of the fibers to be just three microns in diameter and ten microns long. They will be able to pack or disperse relative to their ends (which are to act as centers for inducing incipient crystallization of the calcium hydrosilicate needles, prisms or fibers) in criss-cross fashion. But they are solids and, hence, any two of these fibers will not cross in the same plane. They will pile up. The distance between the surfaces of the free ends of these crossed spicules would be about five microns or a little more. Now the interposition of a third preformed fiber or spicule, in closest three-dimensional random arranged with the first two would stand vertically to the first two. Its faces would then be spaced about two microns or less than the thickness of the fiber from at least one of the faces of the other two spicules.

Hence, with fibers having lengths no greater than about three times their diameters, the exposed, fractured, and, hence, crystallization-reactive and inducing faces will be nearer to each other than the cross-sectional dimensions of their own free ends. Therefore, a crystal growing on one of such end faces will tend to merge with a crystal growing upon a similar adjacent fiber-end face, before it has grown out as great a distance as it has grown sidewise over that face. This is the sort of crystallization that powders as distinguished from fibers will induce.

In this connection, it is also interesting and significant to consider that in approximate terms a 1% pulp or suspension of spicules in water (by weight) would correspond to a volume percentage, with asbestos of sp. gr. 2.5, of about .4%. That is, in one thousand cubic microns of the suspension (or a cube ten microns on a side) there would be four cubic microns of asbestos which would be equivalent to one asbestos fiber, one micron square and four microns long.

If this fiber were in the middle of its allotted ten micron cube it would be four and one-half microns away from the cube wall on each side and three microns away from the cube wall at each end. Hence, it would have an aqueous film of a thickness several times its diameter on each side and almost equal to its length at the ends. If the next adjacent fibers, in adjacent similar ten-micron cubes of liquid, were similarly spaced, and parallel to the first, such adjacent fibers would be nine microns apart at the sides and six microns apart at the ends (or something between these values if the spicules were turned about in different perpendicular or angular directions with respect to each other).

If the fibers were longer than four microns, there would be less of them, of course, in a 1% suspension.

Likewise, if they were bigger in cross section. Thus, a spicule two microns in width and two microns in breadth and eight microns long would equal thirty-two cubic microns and occupy a space equal to eight ten-micron cubes, or a cube 20 x 20 x 20 or eight thousand cubic microns But in such a cube it would have greater spacing, e. g., eighteen microns from the next similarly oriented (parallel) fiber on each side and twelve microns from the next similarly oriented fiber at each end. Hence, it would be freer and more likely to settle out of suspension, or "de-water." This is the characteristic of water dispersions of longer or less de-fibered asbestos or other fibrous aggregates and suspensions.

On the other hand, if the fiber size in cross section is the same as before, e. g., one micron times one micron, but the concentration is increased say to 2% by weight, increasing the length of each fiber, from four microns to eight, then in the distribution above-described the ends of such spicules would approach one another to within four microns of each other, while the sides will be at the same average space from each other as before.

If the fibers remain 1 x 1 micron x 4 microns long and there are more of them (e. g. 4% by weight in the suspension), so that there are say four of them parallel and equally spaced laterally in the ten-micron cube of fluid as supposed above, then they will be separated (by films of water) only four microns apart from each other and four microns from similarly oriented parallel spicules in adjacent ten-micron cubes.

Of course, if the spicules were to swell (laterally) they would still further reduce this distance. Thus, a 4% suspension of spicules is the limit of the free working of paper or asbestos pulps, generally, upon a large scale. And pulps of chrysotile asbestos (which does swell) assume a solid jelly formation at 4% to 6% concentration by weight. Hence, the free working concentration of its pulp is about 1% by weight.

In other words, in an aqueous suspension of the preformed asbestos (or cellulose) fibers or spicules, the water films surrounding such fibers, for a depth of two to six microns, appear to be firmly adsorbed or held by the fibers—and repel each other strongly, so as to produce and maintain the uniform dispersion of the fibers throughout the entire volume of water, in which they are suspended, even though the spiculated fibers do not swell.

The spiculated, dispersed fibers may hydrolyze and swell under such conditions (or such hydrolyzing and swelling may be promoted), as with some forms of asbestos, such as chrysotile asbestos, or with finely divided organic fibers, such as cellulose and its derivatives. This still further promotes the dispersion and the permanency of such dispersions. But asbestos fibers of the prescribed dimensions, which do not swell, e. g., Bolivian Blue asbestos and African Amosite, will also disperse in large volumes of water, and remain dispersed over substantial periods of time, without spontaneous settling, and are also satisfactory for the purposes of this invention. The criterion of the appropriate condition of the fibrous material for the purposes of the present invention, appears, therefore, to be that the fibers shall present numerous free ends, shall be of nearly colloidal dimensions, in cross section, and of sufficient length to permit and promote free and uniform dispersion throughout a volume of liquid upon being mixed therewith in dilute proportions (e. g., 1% to 5%) that they shall acquire and maintain a random arrangement throughout the liquid or fluid mixture (in which such free ends are predominantly maintained spaced apart) and which induce the incipient crystal-formation at such separated points, thus to direct their progressive crystal formation to a fibrous characteristic of habit or growth from such separated points, as distinguished from crystallization from closely contiguous solid surfaces or points, which is the case in dispersions of finely divided powders in which all three dimensions of each particle are approximately the same.

It is to be particularly observed that the end faces of the preformed spiculated fibers, whether inorganic and crystalline or organic and noncrystalline, present free, freshly fractured surfaces, as distinguished from surfaces of natural and, hence, more stabilized formations. They are, therefore, active as incipient centers for the crystallization of the fibrous crystal-forming reagents in solution or dispersion. Since these free ends are of limited or even colloidal dimensions, the sizes of the (seed) crystals which they induce to form thereon are, likewise, limited. Extraneous crystal formation over the natural side surfaces of the preformed fibers or crystals is not promoted so much (if at all) as progressive crystallization when once started, outwardly and radially from these fractured ends. Moreover, any crystallization from the side walls of the fibers would be subject to adhesion, whereas the crystal growth from the end faces of these fractured fibers involves cohesive forces or valence forces of interatomic combination.

While the ultimate formation of such preformed organic or inorganic fibers cannot be regarded as conclusive and certainly determined, it is commonly accepted that finely divided organic fibers, such as cellulose, which are commonly prepared, are made up of still finer and smaller entities, frequently referred to a micelles, which are also of a fibrous characteristic, that is, being long in comparison with their cross-sectional dimensions. Likewise, with inorganic or mineral fibers, such as asbestos, it is known that the fibrous masses as formed present a high order of cleavage in two dimensions, resulting in the easy separation of the mass into long, fibrous crystalline needles. While the ultimate degree of such separation which may be effected is not ascertained, it is known that it may be carried to an extremely small dimension, in both transverse directions. While the lengths of such fine fibers will also be unavoidably considerably reduced by fracture in such operations, the fibrous characteristics will persist and can be effectively maintained to present substantially greater lengths than the cross-sectional dimensions, as above-described.

An underlying cause of such fibrous characteristic of asbestos is attributed to the fact that the silicon and associated oxygen atoms are related and united in chain formation, longitudinally of the fiber crystals. Such union is of a primary valence order and consequently, imparts considerable tensile strength to the fiber, longitudinally, in contrast to the transverse weakness of union between the fibers. Upon transverse fracture of the individual (or ultimate) fibrous crystal, however, it is to be noted that a rupture is thereby effected in the silicon-oxygen atomic chain of the crystal structure. Hence, the corresponding cohesive or valence forces of silicon and oxygen which have constituted the longitudinal tensile strength of the fibrous crystal are liberated and freed for physical or chemical union on the fractured face.

In the present invention, these fractured, and, hence, free, fiber-crystal faces are greatly multiplied and dispersed through a large volume (of water) by spiculation as defined above, and, hence, constitute and provide reactive centers of crystallization of an at least equal (or much greater) amount of the products of active lime and active silica (and water) for the formation thereon, by chemical union and growth therefrom, of fine, needle-shaped or fibrous crystals of hydrous calcium silicate. And it is the nature of such crystal growth, that the growing silicate crystal will form a silicon-oxygen chain constituting a true continuation of the silicon-oxygen chain of the fine fiber-crystals of spiculated asbestos, which have been severed by the spiculation. They will also be held apart in random arrangement, by the random arrangement of the long fine spicules and induced to form similar long fibrous crystals themselves.

Consequently, the formation and growth of such fibrous crystals from the ends of the preformed fiber spicules and their union therewith and with one another, present an intergrown fibrous mass, the strength of which is not measured by the adhesive strength of bonding materials between themselves or between them and the preformed (organic or inorganic) fibers but by the integrated tensile strength of the cohesive forces of the crystallized fiber structures themselves. For when two growing fibrous crystals meet and their intersection forms by mutual crystallization from chemical reaction, the resulting product is a unitary formation of inherent cohesive chemical strength, and not one of external contact, inclusion or adhesion.

For example, if the finely divided reactive silicon component above-mentioned and dispersed or dissolved lime, as in lime water, are dispersed through a very large volume of water, and the particles (or solution) retained in such wide state of dispersion with fine spiculated fibers of asbestos, and the reaction therebetween to hydrated calcium silicate is then effected, the needle-like crystals of hydrous calcium silicate will be induced or compelled to grow longer and finer, and present a dispersed, entangled mass of fibrous crystals throughout the entire volume into which the reactive agents (and such points of inception) have been held suspended during reaction. Moreover, the segregating and forming crystals will, in the course of their crystal growth, to a considerable degree unite at the points of contact between two or more growing crystals and thus become intertwined and will form an interknit, open lattice of permanent arrangement and structure. Upon completion of the crystallization and growth of the crystals and subsequent removal of the residual water from between them, and from any water-bearing gels between them (which is in fact observed to be the case) the mass will present innumerable voids or air spaces, between the fibers, (and through the gel films) which are continuous and capillary in character and intercommunicating, rather than completely surrounded or occluded, by a solid, such as the continuous bond or wall structures which are characteristic of and inherent in the structures of insulating materials of the prior art.

By employing a gel or voluminous disperse phase for the purpose of maintaining or promoting dispersal of the reagents and of the growing fibers, during the reaction, the reaction composition may be further preserved of uniform consistency, composition and dispersion, and also retained in this condition for any necessary or suitable length of time to effect completion of the reaction. At the same time, it may, by slight agitation, be subjected to free liquid flow, plastic flow, or the like, whereby it may be transformed into any shape or dimensions desired. If the shaped mass is then held at rest, the mixture may be restored to gel condition and allowed to react or be subjected to suitable conditions to initiate, promote and complete its reaction, for the formation of the hydrated calcium silicate fibrous needles throughout the entire charge, which consequently conforms to the shapes, dimensions and volumes thus imposed upon it. The partially or completely developed crystalline mass may be subjected to modified or altogether different treatments for special purposes and results. Thus, it may be withdrawn from the shaping means and the reaction may be completed by prolonged time, higher temperatures, pressures and the like, in a different container, with or without drying, as the case may be. Or, the development of the crystals and complete reaction of all the ingredients of the entire charge may be effected in the original shaping means before being withdrawn, if desired. In either case, residual moisture will finally be removed, in any convenient way, and the molded product is ready for use.

The gel, whether formed in the reactions or added to the charge, may or may not enter into the crystal-forming reaction. If it does, subsequent shaping or pouring of the mass may interrupt the crystal formation and, consequently, reduce the potential final strength of the product. If the gel is supplementary to the crystal-forming composition and reaction, however, shaping and pouring of the gel mass may be effected without affecting the crystal formation structure and strength of the crystallized product if it is carried out and completed before substantial intergrowth of the crystals has taken place.

A characteristic of such separate, individual crystal-forming reaction is that the hydrated calcium silicate needles are, as they form from the suspending medium in which the reagents are held, inherently of considerably less volume than the over-all volume of the mass in which they are forming. The product is, therefore, typically composed of a filamentary system or network of unified crystals of fine substantially colloidal dimensions, in cross section, and when the lime and silica have substantially completely reacted the principal or, preferably, the only remaining ingredient of the mass of the charge is water or steam, both of which are substantially ultimately expelled, upon drying, and replaced by air.

When other materials or qualifications are provided in the reactive charge, as above-disclosed, e. g., to serve as a suspension medium or gel, or for other purposes, they may remain therein. Thus, finely divided fibrous cellulose such as paper pulp may serve both as a spiculated fiber and as a gel. In this case the cellulose fibers, of course, remain between the crystallized needles of hydrated calcium silicate, even after the water and steam has been expelled. But though the cellulose fibers may add to the heat insulating properties of the mass at room temperatures, they will tend to be reduced at the temperature of boiling water or above, or the cellulose to be altered or destroyed, as by charring and falling out of the spaces in which it has previously been retained. Such material would not, therefore, be a suitable permanent addition to heat insulating material intended for very high temperature service, though it would serve to promote the disperse formation and dispersed crystallization of the hydrated calcium silicate needles, in intermingled random fibrous formation, and integrated as a mass, for medium or low temperature service.

On the other hand, it is found that by incorporating certain mineral substances, which are both fibrous and capable of undergoing gel formation and retaining their needle-like or fibrous form, such as chrysotile asbestos, a dispersed intra-knit structure of fibrous hydrated calcium silicate crystals and fibrous asbestos crystals may be developed, constituting a fine continuous fibrous structure, throughout the mass, having an inter-knit integral relationship between both kinds of fibers and the gel structure which is strong, of small specific volume and mass, resistant to high temperatures and of random arrangement, consonant with the preservation of the fine, loose, open characteristics of the fibrous structure of the mass as a whole, and also of the aggregate compressive and tensile strengths of both ultimate individual fiber components, per se.

This fine fibrous structure of interlaced and intergrown fibrous crystals is distinguished from the occlusive type of bonding, of fiber to fiber, by wetting, fusing, impregnating and/or like liquid bondings, or impregnations, which are characteristic of the prior art. The latter differ from the intergrowth of fine crystalline fibers by presenting a continuous, more consolidated structure, which is inherently of much greater apparent density, and also contains a larger volume of solid, continuous structure from surface to surface of the same, through which heat may be more readily conducted and dissipated and lost. At the same time, since the voids or pore spaces of the fibrous mass produced by the present invention are not occluded or closed, the apertures between the fibers and the solid crystals themselves and their junctions with one another are so attenuated and of such fine dimensions that oriented spaces, bodies, and surfaces for radiation and convection currents of air through them are broken up and effectively dispersed and prevented from transferring heat progressively or rapidly through the mass as a whole, in any direction, by convection, by conduction, or by radiation. This system, of continuous, filamentary, fine crystal formation and of intervening continuous small attentuated capillary air spaces between and separating them, consequently presents a product which is as a whole of low thermal conductivity and conversely of high insulating value, and yet possessed of high form-retaining value and tensile strength and very low apparent density.

A representative example of the practical application of the invention to the manufacture of heat-insulating materials, more especially of low apparent density and low conductivity will be described, with reference to the accompanying drawings, in which Figure 1 is a diagrammatic flow sheet; and Figure 2 is a more or less diagrammatic illustration of suitable means for spiculating the asbestos fiber.

The asbestos component is preferably first prepared by reducing it from the crude state in which it is mined to an approximate degree of uniformity and purity, relatively free from non-fibrous minerals or other impurities. For example, the untreated asbestos may be composed of chrysotile asbestos fibers, sized as follows:

25% through a ½" mesh and retained upon a ¼" mesh screen (Canadian asbestos specifications)
50% retained upon a 10 mesh screen
25% passing a 10 mesh screen This asbestos fiber is then mixed with water as a liquid vehicle, in tank 1, Figure 1. In carrying out this operation a relatively thick slurry may be effectively employed, as for example, by mixing 1 to 5 parts of fiber by weight, with 99 to 95 parts of water to a uniform mixture by means of a stirrer 2. It is then drawn off through pipe 3 regulated by the valve 4 to the pump 5, whence it may be directed through outlet 6 through the pipe 7 and by opening valve 8, back into the tank 1, the valve 9 leading to the spiculating device 10, remaining closed.

The spiculating device 10 comprises a motor 11 (e. g., three-phase type) adapted to drive shaft 12 which passes into the enclosed chamber 13 and carries on its inner end a hardened steel conical disk 14 having radial flutings 15 in its conical face 16, which is accurately and adjustably spaced from a circular doctor blade 17, the surface of which is parallel to the surface of the conical disk 14 and held firmly in fixed position. The clearance between the conical disk and doctor blade is of the order of .012" to .020". The disk 14 is preferably driven at a high speed of rotation (e. g., 3600 R. P. M.) and preferably under constant maximum load, as indicated by the ammeter 18 (e. g., an operating reading of 70 amps. on the motor used in the instant case) which is indicative of most effective spiculation of the throughput.

With the spiculating rotor at full speed, the valve 9 is now opened leading through the inlet pipe and into the chamber 19 which is on the control or truncated side of the disk. Thereupon the slurry enters the chamber first under the impulse of the pump 5 and thence under the centrifugal force of the rotor and disk 14 which carries it into and through the clearance space between the face of the disk and the doctor blade. In this operation the asbestos fibers are twisted and opened up or separated from each other along their longitudinal planes of cleavage and also fractured and frayed or "broomed" transversely, resulting in a greatly multiplied number of discrete, separate fibrous entities at their ends which are in general characterized by small diameters (e. g., one-tenth to three microns) in which the ratio of length to cross section characterizes them as fibers, as distinguished from fine granules in which all three dimensions are substantially of the same order, and also from that category of fibers which are of such length as to introduce intertwining and snarling or clotting, which is characteristic of unduly long fibers of untreated or non-spiculated asbestos.

As the slurry comes from the spiculator it is collected in the chamber 20, whence it may pass into the educt 21 and thence through valve 22 and pipe 23 into a second tank 24, which is also equipped with a stirrer 25.

When all of the slurry prepared in tank 1 has been thus passed through the spiculator, and collected in tank 24, the operation of the device is reversed. This is done by closing valves 4, 8 and 9 in the lines associated with tank 1 and opening corresponding valve 26 in pipe 27, valve 28 in pipe 29, and later valve 30 opening into the inlet to the spiculating device 10; and also by opening valve 31 in pipe 32 leading from the spiculator outlet 21 back into the tank 1, all of which have previously been closed.

By now operating the pump and spiculating device as before, the batch of slurry will be given a second treatment or pass, similar to the first, and then discharged into the tank 1, until the entire charge has been thus treated a second time.

These operations may be thus reversed and repeated as many times as may be regarded to be necessary or desirable. But for effective reduction of the fibers to a suitable degree for the purpose, two or three passes often have proven sufficient.

When the slurry has acquired the desired degree of spiculation all of the foregoing valves are closed except the valve (4 or 26) in the pipe line leading from the tank containing the finished batch of spiculated asbestos slurry, to the pump 5, and the valve 33 which leads from the outlet of the pump through pipe 34 to the mixing tank 35 is opened. Operation of the pump 5 will then deliver the entire batch into the mixer 35.

The mixer 35 is a usual type of horizontal cylinder, with a pair of oppositely pitched helical, ribbon-shaped mixing blades.

Previous to the introduction of the prepared asbestos slurry into the mixer, a suspension of finely pulverized quicklime (e. g., 100 mesh and finer) is hydrated with water which is at room temperature and in sufficient quantity to provide a freely fluid suspension preferably at a temperature of 160° to 200° F. The amount of water employed is such as to produce a composition in the mixer of the desired consistency, dispersion and suspension. For example, five times as much water as quicklime, by weight, will produce effective slaking, dispersion, and a satisfactory resulting slurry. When the lime is completely hydrated and dispersed in the water in the mixer, the slurry or spiculated asbestos fibers is pumped in, mixed thoroughly, and the requisite amount of finely divided silica, diatomaceous earth or the like is added in finely powdered dry condition, and the mixing continued until complete and uniform dispersion of the entire batch is effected.

Typical and representative examples of compositions, which may be prepared in accordance with the procedure of the invention are as follows:

I

Lime, 30% by weight, e. g., 30 lbs.
Quartz flour, 25% by weight, e. g., 25 lbs.
Diatomaceous earth, 25% by weight, e. g., 25 lbs.
Asbestos (beaten), 15% by weight, e. g., 15 lbs.
Asbestos (untreated), 5% by weight, e. g., 5 lbs.
Water with asbestos, 350% of total weight of solids, e. g., 350 lbs.
Water, with lime, 150% of total weight of solids, e. g., 150 lbs.

II

Lime, 30% by weight, e. g., 30 lbs.
Diatomaceous earth, 50% by weight, e. g., 50 lbs.
Asbestos (as prepared in apparatus of Figure 2), 20% by weight, e. g., 20 lbs.
Water with asbestos, 400% of total weight of solids, e. g., 400 lbs. (or to 470 lbs.)
Water with lime, 150% of total weight of solids, e. g., 150 lbs. (or to 130 lbs.)

III

Lime, 30% by weight, e. g., 30 lbs.
Diatomaceous earth, 50% by weight, e. g., 50 lbs.
Asbestos (as prepared in apparatus shown in Figure 2), 20% by weight, e. g., 20 lbs.
Water with asbestos, 850% of total weight of solids, e. g., 850 lbs.
Water with lime, 150% of total weight of solids, e. g., 150 lbs.

IV

Lime, 33% by weight, e. g., 33 lbs.
Quartz flour, 60% by weight, e. g., 60 lbs.
Asbestos (completely spiculated, e. g., dry, in air suspension), 7% by weight, e. g., 7 lbs.
Water with lime, 150% of total weight of solids e. g., 150 lbs.
Water, 100% fo total weight of solids, e. g., 100 lbs.

The mixing operation usually requires from thirty minutes to an hour. When complete, the mixing is stopped and the slurry is withdrawn, and may be flowed by gravity into metal molds or pans 36 or similar containers, which are preferably thin and good conductors of heat, which are then placed in a chamber 37 and subjected to live, saturated steam at 120 lbs. pressure, e. g., three hours to bring the charge up to temperature, held for a period of twelve hours at constant pressure and allowed to cool and the pressure to fall to that of the atmosphere over a period of five hours more or less. They may then be withdrawn or allowed to cool further. The molded charge will be found to have become indurated in its original size and shape without appreciable separation of water, nor shrinkage from its original size and shape.

The molded product may, therefore, be removed from the pans, and the contained water removed by drying at 250° to 350° F. leaving a product having the shape and dimensions imparted to it by the molds, and a weight equal to that of the solid components of the reaction mixture only (plus the combined water of crystallization and absorbed moisture, and absorbed water, if present) and from which the water of dispersion has been removed, and which is of low apparent density accordingly.

For example, such a product (e. g., of Formula II) manifests an apparent density of about eleven pounds per cubic foot and having a conductivity of approximately .002 at hot side temperatures up to 1200° F. if the cold side is at about 150° F. This apparent density may be controlled in terms of the concentration of solids in the original slurry from which it was prepared and which was indurated. And since there is no appreciable volume change in the process the product will have substantially the same apparent density in pounds per cubic foot that the original slurry contained in terms of its solid components (plus water of crystallization and/or otherwise bound water), the voids in the one case being filled with liquid water and in the other case with air.

Obviously, other products may be produced, by preparing slurries of spiculated asbestos, in which its markedly prolonged or permanent suspending powers may be utilized, for many purposes. Thus, it may serve to effect and maintain the dispersion of much heavier materials or larger proportions of reagents, during reaction or other treatments, whether the product is to be of low or high apparent density.

In this invention both the degree of spiculation and the proportion of short to long fibers are controlled and, in turn, determine the properties which are desired in the product. In this respect the present invention differs fundamentally from other attempts in the art.

For example, in the production of high density structural materials, more densely populated with solid cementitious reagent materials and reaction products, completely spiculated asbestos, of the order (A) as defined above, has been found to be most desirable in increasing the ultimate flexural strength of such products. In the production of low density products, designed to serve as a form-retaining heat insulation product, comparatively sparsely populated with solid cementitious reagent materials and reaction products, the partially spiculated asbestos of the order (C) as defined above has been found to impart relatively high flexural strength, in comparison with low apparent density products of the prior art, and also high residual strength after initial fracture of the cementitious bond.

The spiculated asbestos may be produced from commercial grades of asbestos by treating a suspension of such asbestos in a fluid (either gaseous or liquid) in an instrument or apparatus which subdivides the fibers by the action of attrition or the cyclonic vortex of the fluid revolving at high angular velocities. Such disintegration can be accomplished by various mills designed to operate using compressed air, or high pressure superheated steam as the fluid medium, or it may be accomplished by agitating a dilute suspension of about 5% more or less by weight (1% to 10%) of asbestos in water by means of one or more high speed propeller agitators, or it may be accomplished by beating such a suspension in paper pulp beater. But in each of these operations, the treatment is conducted to a much more intensive degree and is prolonged much beyond that ordinarily employed in such procedures and equipment for the preparation of the pulps which they are primarily designed to prepare, in order to effect the required degree of reduction of the fiber size and the required proportion of the fibrous material to that size or sizes characterizing spiculated asbestos. Thus, completely spiculated asbestos fiber may be produced by prolonged or repeated treatment, in the apparatus shown, of a 1% suspension by weight. The net result of such treatments is to disintegrate the bundles of spicules or fiber content of the commercial grades of asbestos into substantially their ultimate spicules, but without destroying their fibrous characteristics of length relative to their cross-sectional dimensions.

Consonant with the present disclosure, the "spiculated fibers" or "spicules" are characterized by being capable of forming a relatively permanent or static suspension in water, e. g., which are in concentrations of $^1/_{10}$% to 2.5% (or more) by weight or $^1/_{25}$% to 1% by volume (or more) are, per se, resistant to segregation by gravity for a period of several hours (or even for days).

Such static dispersion and prolonged suspension of fine spiculated fibers, therefore, constitute a disperse system in which numerous unique conditions and characteristically novel reactions and results may be attained.

Thus, other fibrous materials, or granular materials, or finely divided solid reagent materials (or in solution) which are not capable of prolonged suspension in liquids may be mingled with them, and the resulting mixture will acquire this capacity for forming and maintaining a uniform, prolonged or permanent static suspension, without appreciable segregation, for a substantial period of time. Accordingly, various reactions and other changes may be effected throughout such three-dimensional suspensions and successively controlled to definite degrees of (1) initiating such reaction, (2) promoting or controlling it to any desired stage, or (3) carrying it to completion. Moreover, other procedures may accompany or intervene between these successive stages of physical and/or chemical reaction in the system, such as shaping or molding the mass before initiating the reaction, after initiating the reaction or after promoting the reaction to any desired degree. Moreover subsequent treatments may be effected upon the resulting mixture at any selected stage of operation, according to the characteristics of conditions and properties thus acquired and according to the ultimate changes and results desired.

Thus, for example, in the specific examples described above, by employing reactive lime and a reactive silica (slightly in excess of equimolecular proportions) and carrying the reaction to substantial completion, a new hydrated lime-silicate having the composition $CaO.SiO_2nH_2O$ is formed, which upon examination, exhibits a novel X-ray pattern, distinguishing it from all of the known silicates of lime.

It is believed that in the static, continuous, but open filamentary network of suspended spicules, which are characteristically capable of sustaining themselves in such arrangement and dispersion throughout the volume of water in which such network is formed, numerous reagent materials, both in solution and in the form of solids of small and comparatively large dimensions, are rendered susceptible to controlled reaction, both chemically and physically.

Thus, in the charges above-described, the lime is present both in solution and in colloidal to visible particle sizes. The silica is, likewise, present in fine sizes, either as quartz flour or as powdered diatomaceous earth, though particles of the latter may be considerably larger than the fibrous spicules. The silica also is capable of going into solution. Hence, reaction between dissolved lime and dissolved silica may be predicated. Moreover, owing to the porosity or permeability and also the amorphous and active character of the silica of the diatomaceous earth, the lime solution and suspension is capable of penetrating the large particles of diatomaceous earth relatively freely. Furthermore, under such conditions, the dissolved lime is capable of reacting with many times (e. g., thirty-five times) its molecular equivalent of silica and dispersing or dissolving the resulting combination in the surrounding aqueous medium. Such a combination may be postulated or visualized as a long chain of silicon and oxygen, combined at its ends to one molecule of lime.

Such action will obviously quickly and completely disintegrate and momentarily at least, dissolve the silica or diatomeceous earth, all out of proportion to the (equi)-molecular quantity of lime present. But the concentration of such lime-silica combination which can be retained in solution is rather small. It is competent to re-orient itself, and in so doing, fibrous crystals of lime silicate of the formula $CaO \cdot SiO_2 \cdot nH_2O$ separate out and grow, as above-described, distributed throughout the volume of the reactive mass. The silicon-oxygen, or silica chains thus liberated, may, in turn, react with more lime to form lime silicates of varying compositions, or additional crystalline calcium silicate. Such silica chains or lime silicates tend also to go over to gel formations, distributed throughout the mass. These, in turn, may progressively, and rapidly or slowly, according to conditions, be converted into and thus feed the growing fibrous crystalline structures above-described. Upon such crystal formation being arrested, however, the gel structure will remain. Thus, if the water medium is removed, such crystalline growth of fibers may be stopped, and heat and dehydration serve to collapse the gel structure upon the preformed fibrous spicules, the growing fibrous crystals, and within themselves, thus opening up voids between the fibers and creating continuous and, hence permeable openings through the gel itself so as to produce the typical structure of the novel product obtained.

Further heating, drying, and dehydrating of the spicules, fibrous crystals, and gel structure, is accompanied, by a shrinkage in absolute volume, hardening, and strengthening of each, and also of the union between them, to constitute the integral, form-retaining and strong structure, characteristic of the whole, which has not been secured in the processes and insulation materials of the prior art.

All of the modifications and adaptations, both of the underlying principles and of the practical applications of my invention, which may be made within or derived from the purview and scope of my disclosure are intended to be constructed as contemplated and as claimed herein.

The foregoing constitutes the specification of my application Serial No. 560,512, filed October 26, 1944, of which this application is a continuation-in-part.

Supplementary to said disclosure and description it may be pointed out that the permanent, self-sustaining suspension of 0.1% of spiculated asbestos( by weight or .04% by volume) thus described presents a very open lattice, in which each fiber is surrounded by many times its volume of water; but that up to this degree of dilution the water surrounding each fiber is so associated with that fiber that the fiber and water act as an entity. They will attract and repel a similar fiber and its associated water sufficiently to effect and maintain this evenly spaced relationship against the forces of gravity, whether of buoyancy or of settling. But if such a suspension be further sharply diluted with water, the suspension breaks, the fibers float to the top, leaving clear water below, and forming a top layer comprising a suspension of approximately the original limit concentration before such dilution (or a slightly greater concentration) which floats on the lower water layer.

Therefore, this degree of dilution indicates the limit of the thickness of the water envelope about the fibers which is effective to keep each fiber apart from adjacent fibers and also to prevent free movement of one fiber past or against the other, such association of water to adjacent fibers also prevents free circulation of water between such adjacent fibers, so as to cause segregation by settling or floating. On the other hand, the water envelope is not sufficiently firmly associated with its fibers to prevent it from being readily filtered or drained out of the fibrous mass, and thus letting the fibers come together. In other words, the system is a discontinuous suspension of fibers, which is stable and permanent so long as the water medium is maintained, but it is not a gel nor a continuous gel, even with chrysotile fibers which swell somewhat.

In this open, three-dimensional fibrous network or lattice system, therefore, the reagent materials, as finely divided solids or in colloidal or true solution, are capable of dispersion, without destroying the lattice structure or suspension. Both lime and diatomaceous earth, for example, are capable of such subdivision to colloidal dimensions and of going into true solution. When or insofar as the reagents are present in the latter conditions they react rapidly and produce a dilute gelatinous precipitate of hydrous calcium silicate. Owing to the dispersed, dilute character of this gelatinous precipitate, it is mobile and is attracted to the spiculated asbestos fibers. It freely conforms to the outer surfaces of the fibers, forming around each of them a sheath of gelatinous hydrous calcium silicate. This sheath, therefore, surrounds each of the fibers, within the envelope of water which was associated with and surrounded each of these fibers and which still nonetheless continues to be effective to maintain the hydrous calcium silicate gel-coated fibers in their widely spaced dispersed relationships.

Therefore, the dissolved reagents permeate the water envelope of these fibers and a gelatinous precipitate builds up directly upon each fiber, without affecting or destroying the separating envelopes of water about each asbestos fiber. The latter are, therefore, continuously maintained in their original spaced relationships and continue to occupy their same volume and shape, in the original network or lattice system which they formed in the water dispersion alone.

Such reactions of dissolution and combination of the lime and silica, e. g., in the form of diatomaceous earth, proceed at ordinary temperatures. If the temperature is raised, the reactions are accelerated, the formation of crystalline hydrous calcium silicate also takes place, either by direct crystallization from solution or by conversion of the gelatinous precipitate to a gel, ultimately to develop prominent crystalline forms. But the crystalline formations of the invention have been described in detail above.

Such dissolution, reactions and precipitation of the reagent materials, and selective deposition of gelatinous precipitates may also take place independently of the fibers and form clots or colonies of gels and crystals throughout the volume of the mass and yet not interfere with the maintenance of the dispersion of the spiculated fibers, as originally set up in pure water. Hence, the gelatinous sheaths of hydrous calcium silicate surround and grow out from the continuously dispersed spiculated fibers of asbestos and clumps of gelatinous precipitate of hydrous calcium silicate also simultaneously form independent of and spaced from the fibers in the aqueous medium.

Crystals of hydrous calcium silicate may form directly from solution and/or further crystallization may take place by conversion of the gelatinous precipitates to crystalline form. But the gelatinous precipitates, especially on the fibers tend to consolidate to gels, of greater cohesive and adhesive strength, lower volume, and greater density than the original gelatinous precipitates.

In so doing they coalesce about the fibers and then contract and commensurately leave increasing spaces of open water between one such fiber and the next, since the fibers themselves neither when bare nor when coated with the gelatinous or gel-like sheaths, manifest any tendency to come together into direct contact so long as a sufficient relative volume of the aqueous medium is maintained about and between them.

Accordingly, the charge as a whole, consists initially of dispersed spiculated fibers with subsequently intermingled finely divided lime and diatomaceous earth, in finely divided form, colloidal suspension and in solution. Reaction produces discrete gelatinous precipitates which accumulate about the spaced fibers, forming an enclosing sheath about each, and also dispersed gelatinous precipitates, in colonies which are independent of the fibers. These gelatinous precipitates may be of silica or lime or of hydrous calcium silicate. They form at ordinary temperatures and grow larger with time and with increased temperatures. At elevated temperatures crystals of hydrous calcium silicate also form, throughout the mass, both from solution and from the gelatinous precipitates. They form on the fibers and are also spaced from the fibers. Throughout such reactions and growths, the fibers maintain their original spaced relationships and, accordingly, as the gelatinous precipitates consolidate about their respective fibers and the crystals separate likewise, from the intervening spaces, the latter remain occupied by water alone.

When such reactions are complete, the water is allowed to vaporize and escape. The residual gelatinous precipitates or gel-sheaths about the fibers (which have already shrunk to true gels) then acquire a porous structure, then submicroscopic crystal formations, and develop greater cohesive, adhesive and total strength, accordingly.

The independent clots or colonies of gelatinous precipitates, which form between and independent of the fibers do not wet the fibers with a spreading meniscus. But they do contact them ultimately (with loss of the dispersing water which maintains them separate) in the form-retaining masses which become substantially one-dimensional fibers as they adhere and continue to shrink, upon dehydration, to stiff gels. The gel-like sheaths of the spiculated fibers and the precipitated gel fibers thus formed may or may not be crystallized by subsequent treatment, but in either case they reinforce the crystalline forms generated by direct separation from solution between the spicules which are described in the foregoing specification, and constitute an integrated network and solidified structure.

The whole mass thus ultimately becomes an integral, open, fibrous mass of light-weight, low-heat conductivity, high tensile strength, and is resistant to both water and high temperatures, making it suitable as a shaped, self-sustaining, low-apparent density heat insulation material, suitable and satisfactory for use at high temperatures, and for making complete heat insulating installations, of one composition and in one piece.

I claim:

1. The method of making a light-weight open fibrous structure comprising forming a stable dispersion in water of spiculated fibres selected from the group consisting of asbestos and cellulose fibres, lime and finely divided silica, the lime being present in proportion to spiculated fibres of at least about 1.5 to 1 by weight, and the silica being present in not less than equi-molecular proportions of the lime, said spiculated fibres being predominantly of cross-sectional dimensions from about one-tenth to three microns and of lengths which are at least about three times their respective cross-sectional dimensions and being from about $^1/_{25}$% to not greater than about 5% by volume of the water, *the ratio of the weight of the water to the total weight of solids being at least about 2:1,* reacting said lime and silica by heating the mixture while preventing substantial loss of water to form a solid, hydrous, lime silicate, said dispersion retaining its stability during the reaction and said spiculated fibres and reaction product forming an integrated structure having substantially the volume and shape of the dispersion and which volume and shape are substantially retained upon dewatering.

2. A form-retaining product characterized by being of a continuous, open, fibrous structure [composed of] *comprising* spaced, randomly dispersed, spiculated fibres selected from the group consisting of asbestos and cellulose fibres which are predominantly of cross-sectional dimensions from one-tenth to three microns and of lengths which are at least three times their respective cross-sectional dimensions, bonded with a solid, hydrous, lime silicate, said product being prepared by the method of claim 1.

3. The method according to claim [1] *8* wherein the spiculated fibres are asbestos fibres.

4. The method according to claim 3 wherein a relatively small amount of unspiculated asbestos fibres are also present in the dispersion in water.

5. The method according to claim [1] *8* wherein hydrous lime silicated is formed as crystalline fibres.

6. The method of making a light-weight, open fibrous structure comprising forming a stable dispersion in water of spiculated fibres selected from the group consisting of asbestos and cellulose fibres, lime and finely divided silica, the lime being present in proportion to spiculated fibres of at least about 1.5 to 1 by weight, and the silica being present in sufficient amount to convert substantially all of the lime into hydrous calcium silicate, said spiculated fibres being predominantly of cross-sectional dimensions from about one-tenth to three microns and of lengths which are at least about three times their respective cross-sectional dimensions and being from about $^1/_{25}$% to not greater than about 5% by volume of the water, *the ratio of the weight of the water to the total weight of solids being at least about 2:1,* reacting said lime and silica by heating the mixture while preventing substantial loss of water to form a solid, hydrous, lime silicate, said dispersion retaining its stability during the reaction and said spiculated fibres and reaction product forming an integrated structure having substantially the volume and shape of the dispersion and which volume and shape are substantially retained upon dewatering.

7. A form-retaining product characterized by being of a continuous, open, fibrous structure [composed of] *comprising* spaced, randomly dispersed, spiculated fibres selected from the group consisting of asbestos and cellulose fibres which are predominantly of cross-sectional dimensions from one-tenth to three microns and of lengths which are at least three times their respective cross-sectional dimensions, bonded with a solid, hydrous, lime silicate, said product being prepared by the method of claim 6.

*8. The method of making a light-weight, open, fibrous structure, comprising forming a stable dispersion and suspension in water of spiculated fibres selected from the group consisting of asbestos and cellulose fibres, and finely divided materials containing lime and silica which are reactive with each other in water, the lime being present in proportion to spiculated fibres of at least about 1.5 to 1 by weight, and the silica being present in sufficient amount to convert substantially all of the lime into hydrous calcium silicate, said spiculated fibres being predominantly of cross-sectional dimensions from about one-tenth to three microns and of lengths which are at least about three times their respective cross-sectional dimensions and being from about $^1/_{25}$% to not greater than about 5% by volume of the water, the ratio of the weight of the water to the total weight of solids being at least about 2:1, reacting said lime and silica by heating the dispersion while preventing substantial loss of water therefrom to form a solid, hydrous, lime silicate, said dispersion retaining its stable suspension during the reaction thereby forming an integrated structure having substantially the volume and shape of the dispersion and which volume and shape are substantially retained upon dewatering.*

*9. The method of making a light-weight, open, fibrous structure, comprising forming a stable dispersion and suspension in water of spiculated fibres selected from the group consisting of asbestos and cellulose fibres, and finely divided materials containing lime and silica which are reactive with each other in water, the lime being present in proportion to spiculated fibres of at least about 1.5 to 1 by weight, and the silica being present in sufficient amount to convert substantially all of the lime into hydrous calcium silicate, said spiculated fibres being predominantly of cross-sectional dimensions from about one-tenth to three microns and of lengths which are at least about three times their respective cross-sectional dimensions and being from about $^1/_{25}$% to not greater than about 5% by volume of the water, the ratio of the weight of the water to the total weight of solids being at least about 2:1, reacting said lime and silica by heating the dispersion while preventing substantial loss of water therefrom to form a solid, hydrous, lime silicate, said dispersion retaining its stable suspension during the reaction thereby forming an integrated structure having substantially the volume and shape of the dispersion and which volume and shape are substantially retained upon dewatering, and dewatering.*

*10. A form-retaining product characterized by being of a continuous, open, fibrous structure comprising spaced, randomly dispersed, spiculated fibres selected from the group consisting of asbestos and cellulose fibres which are predominantly of cross-sectional dimensions from one-tenth to three microns and of lengths which are at least three times their respective cross-sectional dimensions, bonded with a solid, hydrous, lime silicate, said product being prepared by the method of claim 8.*

*11. A form-retaining product characterized by being of a continuous, open, fibrous structure comprising spaced, randomly dispersed, spiculated fibres selected from the group consisting of asbestos and cellulose fibres which are predominantly of cross-sectional dimensions from one-tenth to three microns and of lengths which are at least three times their respective cross-sectional dimensions, bonded with a solid, hydrous, lime silicate, said product being prepared by the method of claim 9.*

*12. A form-retaining product characterized by being of a continuous, open, fibrous structure comprising spaced, randomly dispersed, spiculated asbestos fibres which are predominantly of cross-sectional dimensions from one-tenth to three microns and of lengths which are at least three times their respective cross-sectional dimensions, bonded with a solid, hydrous, lime silicate, said product being prepared by the method of claim 8.*

*13. A form-retaining product characterized by being of a continuous, open, fibrous structure comprising spaced, randomly dispersed, spiculated asbestos fibres which are predominantly of cross-sectional dimensions from one-tenth to three microns and of lengths which are at least three times their respective cross-sectional dimensions, bonded with a solid, hydrous, lime silicate, said product being prepared by the method of claim 9.*

LEWIS H. D. FRASER.

No references cited.